United States Patent [19]
Craven

[11] Patent Number: 5,176,288
[45] Date of Patent: Jan. 5, 1993

[54] CONTROL DISPENSING APPARATUS FOR VENDING MACHINES

[75] Inventor: Herman Craven, Fresno, Calif.

[73] Assignee: The Vendo Company, Fresno, Calif.

[21] Appl. No.: 466,535

[22] Filed: Jan. 17, 1990

[51] Int. Cl.$^5$ .............................................. B65G 59/00
[52] U.S. Cl. ..................... 221/124; 221/129; 221/130; 221/131; 221/133; 221/195; 221/241; 221/258; 221/277
[58] Field of Search ............... 221/123, 124, 125, 129, 221/130, 131, 133, 194, 195, 224, 241, 242, 258, 277; 312/45, 72, 73

[56] References Cited

U.S. PATENT DOCUMENTS

| | | | |
|---|---|---|---|
| 3,606,081 | 9/1971 | Croteau et al. | 221/258 X |
| 3,799,393 | 3/1974 | Baxendale | 221/67 |
| 3,831,806 | 8/1974 | Lindsey | 221/129 X |
| 4,917,264 | 4/1990 | Gasiel et al. | 221/124 |

FOREIGN PATENT DOCUMENTS

1046997 11/1966 United Kingdom ................. 221/124

Primary Examiner—David H. Bollinger
Attorney, Agent, or Firm—Robbins, Dalgarn, Berliner & Carson

[57] ABSTRACT

A novel control storing and dispensing apparatus for a vending machine, or the like is provided, the apparatus being particularly adapted for storing and dispensing cylindrical products of various types and sizes in single and multiple depth stack fashion. The dispensing mechanism for each section includes at least one motor-driven auger mounted in an almost horizontal position in relation to cylindrical products rolling down a shallow slope to control storing, feeding and dispensing of said cylindrical products from the bottom of a stack for each selection, as the mechanism is cycled. The apparatus can also be used to dispense cylindrical products of a relatively wide range of diameters by using spacers or movable ramps to position products properly to fit into the auger track. The apparatus also can dispense a product longer than conventional cans, such as certain bottled beverages, by using several augers. By coupling a second auger to a first powered auger and timing the dispense mechanism of two adjacent columns, products from the two columns can be dispensed simultaneously or alternately.

7 Claims, 5 Drawing Sheets

CONTROL DISPENSING APPARATUS FOR VENDING MACHINES

BACKGROUND OF THE INVENTION

1. Field of the Invention

The present invention relates to novel control dispensing apparatus (hereinafter known as "apparatus") and mechanisms for storing and dispensing products from vending machines or the like. Particularly, the present invention relates to such apparatus and mechanisms adapted to handling bottled, canned and other generally similarly shaped products of various types and sizes. More particularly, the present invention relates to motor-driven auger release control apparatus and mechanisms adapted to dispense selectively products from the bottom of an upper storage apparatus rolling down a shallow slope such as a serpentine channel or the like, in which such products are stored in a column of single or multiple depth stack.

Broadly, the present invention provides apparatus and mechanisms for the purpose mentioned, which overcome various limitations and disadvantages of prior vending machines such as gated dispensing apparatus, especially with respect to adaptability for efficiently handling various types and sizes of products, structural simplicity, economy of manufacture, and reliability of operation of dispensing apparatus and mechanisms requiring a minimum of driving power. More specific objects and advantages of the invention will hereinafter be made clear or become apparent to those skilled in the art during the course of explanation of preferred embodiments of the invention.

2. Description of the Prior Art

Machines for vending generally cylindrical products, such as cans or bottles from a stack thereof, in which the products are stored in vertical engagement with the axis extended substantially horizontally and in parallel relation are well-known. Reference is made to U.S. Pat. No. 3,799,393 entitled "Staggered Stack Vending Machine", issued Mar. 26, 1974 and references cited therein, which illustrate not only the general course of development of prior machines for dispensing products from single or multiple column-staggered stacks, but also specific examples of prior dispensing apparatus, mechanisms, storage arrangements and product guiding and confining means.

As will be appreciated from such patents, the use of vertical or inclined single or multiple columns of products and staggered stacks for product storage has long known to present a set of problems with respect to the provision of a suitable apparatus for reliably and efficiently dispensing products from such columns, particularly when products of a variety of types and sizes are to be handled. The problem of properly confining and guiding products for storage and gravitational advancement in single, multiple or staggered stack in a manner to minimize jamming thereof has received considerable previous attention, but the problem has remained as to how to accomplish such function with simple, economical and easily adjustable structures that can reliably handle products of various types and sizes in different, basically identical, storage magazines of the same machine or at different times in the same magazine.

As the above-mentioned patents will attest, earlier product releasing apparatus and mechanisms in general employed quite complex and expensive means requiring careful adjustment for controlling dispense of products. For example, the release mechanisms described in the prior art for serpentine channels uses solenoids to operate, release and hold the gate. Such mechanisms use a number of parts and require precise micro-switch control to provide a snap-action response to the rapid shock force of the solenoid armature. Since vending mechanisms with solenoids are expensive, prior art solenoid dispensing mechanisms generally cost at least twice as much as the present novel motor-driven auger release control dispensing mechanism.

SUMMARY OF THE INVENTION

The apparatus and mechanism of the present invention require significantly lower power for operation by the use of serpentine-type tracked product magazines which minimize the weight of products that needs to be lifted, thus enabling miniature low torque vend motors to be used in combination with a plastic auger.

The apparatus and mechanism is particularly adapted to dispense cylindrical products from a column of a single or multiple depth stack and has outstanding reliability, requires little or no maintenance, and does not require unusual skills or special tools to operate or repair.

The present invention provides an apparatus and mechanism which give a quick vend to the customer and will not damage cylindrical products having a relatively weak or soft periphery.

The apparatus and mechanism can dispense, by using spacers or movable ramps to position products properly to fit into the auger track, cylindrical products of a relatively wide range of diameters.

By the use of several augers the apparatus and mechanism can also dispense products longer than conventional cans.

By coupling a second auger to a first powered auger the apparatus and mechanism can be timed so that two adjoining columns can be controlled to alternately vend one flavor or product per cycle, thereby doubling a flavored product capacity without the cost and complexity of two complete vend systems.

The apparatus and mechanism can further be adapted for use in existing single and multiple column vending machines and control apparatus thereof and for use in future such machines and apparatus.

No critical adjustments or control of the apparatus and mechanism is required and yet the cylindrical product is well retained against theft.

Finally, improved elements and arrangements thereof in such an apparatus and mechanism which are rugged, dependable, economic to manufacture and maintain, durable and fully effective in performing its intended purposes are provided.

BRIEF DESCRIPTION OF THE DRAWINGS

The above and other features of the present invention may be more fully understood from the following detailed description, taken together with the accompanying drawings, wherein similar characters refer to similar elements throughout and in which.

DESCRIPTION OF THE PREFERRED EMBODIMENT

Figure 1:
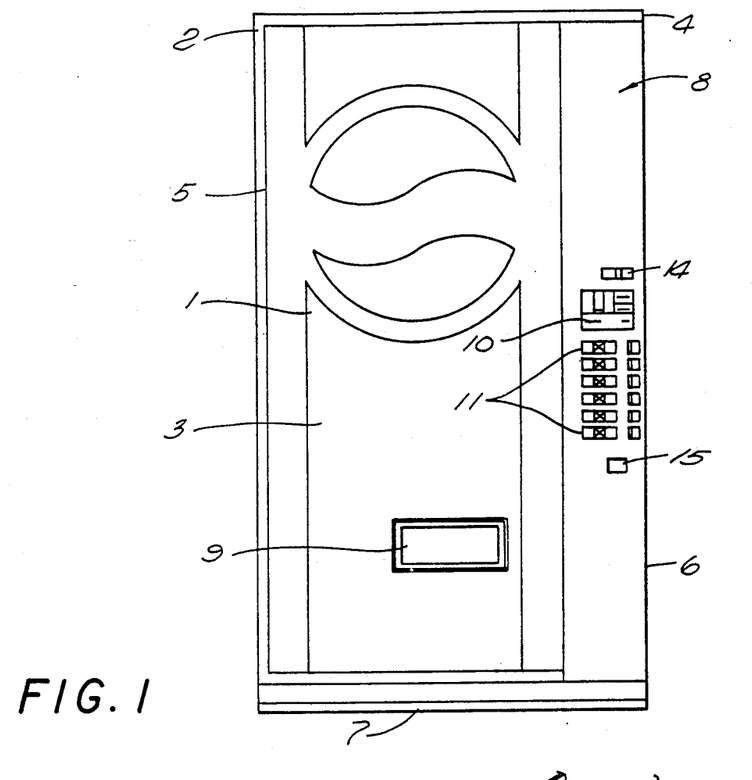
FIG. 1 is a front elevational view of a typical vending machine for dispensing cylindrical products on a selective basis into which the apparatus of this invention has been incorporated.

Referring first to FIG. 1, a product dispensing machine 1 of the coin-controlled or vending machine variety is generally provided with a rectilinear cabinet 2 having a front wall 3, a top wall 4, a pair of side walls 5 and 6, a bottom wall 7 and a back wall 8 defining an interior for receiving, storing and frequently refrigerating, heating or otherwise conditioning quantities of a plurality of varieties of products to be selectively dispensed from a product delivery station 9 in response to deposit of appropriate coinage through a slot 10 and activation of one of a plurality of product selection switch buttons 11 each corresponding to a particular variety of product handled by the machine. A slot 15 is also provided for coin return and change purposes. It being understood that the cabinet 2 generally also houses suitable electrical power and selection control circuitry, and the like, that either may be conventional or do not constitute an integral part of the improvements forming the subject matter of this invention and are, therefore, omitted from the drawings.

Figure 2:
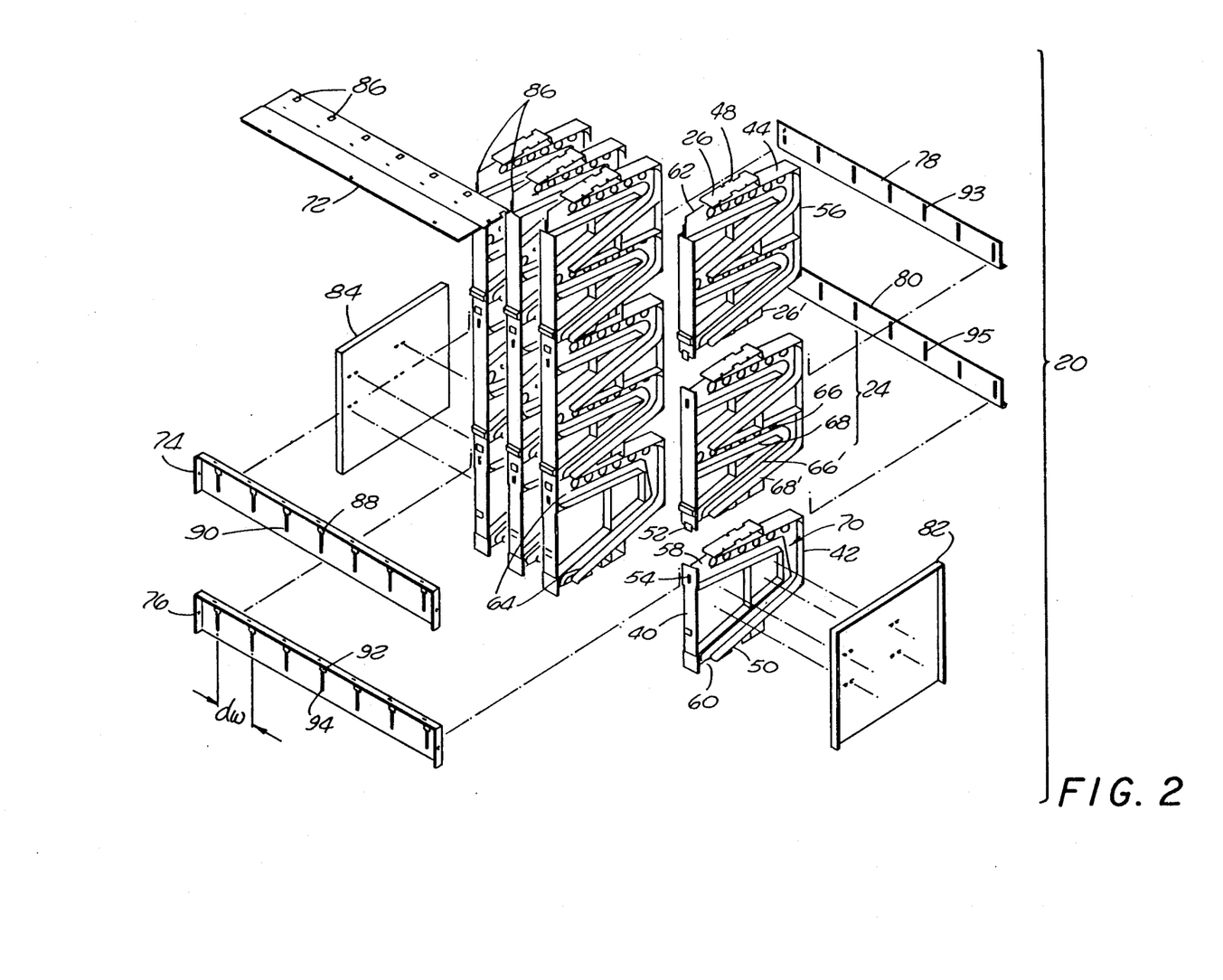
FIG. 2 is a perspective view taken along the front-right intersection (hereinafter the "intersection direction") direction of the vending machine as shown in FIG. 1 with the door removed, and with some parts broken away showing the upper serpentine feed magazine in cross section for clarity of illustration.

Referring now to FIG. 2, which is a perspective view taken along the intersection direction of the interior of the vending machine with the door removed from the lock 14, the upper product apparatus 20 is shown just above the apparatus. The upper product storage apparatus 20 constitutes the upper product storage space available within the machine 1.

It will be apparent to those skilled in the art that the upper product storage apparatus 20 used in the upper product storage space can be of any depth suitable for successively storing generally cylindrical products in a single or multiple stack arrangement or the like. The type of upper product storage apparatus 20 used in the preferred embodiments of this invention includes those fully cited in U.S. Pat. No. 3,498,497, entitled "Double Depth Serpentine Can Vender", the disclosure of which is hereby incorporated herein by reference.

It is also noted here that the top stack product storage arrangement employed in this invention includes those earlier vertical single and multiple stack arrangements well-known in the art.

Now referring back to FIG. 2, it will be further apparent to those skilled in the art that the present invention is not specifically so limited and that various product mixes and capacities may be provided while utilizing the dispensing apparatus of this invention. In FIG. 2, the particular embodiment chosen for illustration is shown to accommodate a total of four product varieties.

For each product variety, the upper product storage apparatus 20 contains a number of serpentine feed magazine units 24 connected together through upper connectors 26 and lower connectors 26' to form a column. There can be any number of units of serpentine feed magazine in a column. With the apparatus of the present invention connected, the number of units in a column is limited only by the height of the cabinet of the vending machine used.

Each serpentine feed magazine unit 24 is bounded on four sides by the front 40, rear 42, top 44 and bottom 46 surfaces. An upper connector 26 is mounted, welded or molded as part of the top surface 44 and with tabs 48 for connecting through the slots 50 of a bottom connector 26', which itself is mounted, welded or molded as part of the bottom surface 44 of another serpentine feed magazine unit.

The front surface 40 is provided with a clip-like connecting structure 52 and a tab 54, while the rear surface 42 has a tab 56. Front sections 58 and 60 of the top and bottom surfaces, respectively, are specifically missing for receiving or dispensing a plurality of bottled, canned or similarly shaped products from another serpentine feed magazine unit. A vertical stationary partition 62 at the center of all four surfaces 40-46 provides a closed surface to the product in the serpentine feed channel 64. Generally, each serpentine feed channel 64 contains one or more loops of inclined rails 66 and 68, sloping downward from the front to the rear surface, and inclined rails 66' and 68', sloping upward from the front to the rear surfaces. The inclined rails 66, 66', 68 and 68' are welded, molded or formed integrally with the vertical partition 62. As shown in FIG. 2, the turn 70 of the serpentine channel is a curved surface to insure that the cylindrical objects roll down smoothly from the front surface of the serpentine feed magazine and without jamming or causing too much vibration to the cylindrical objects. The vertical partitions terminate in the right and left directions by the right and left side walls 5 and 6, respectively.

After units of the serpentine feed magazine 24 have been assembled into separate vertical columns, further support for the structure is provided by horizontal support structures 72-84. The top support structure 72 is snapped into the top connectors 26 of all the top units of serpentine feed magazine columns through slots 86. The upper front straps 74 are snapped into connecting structures 52 and tabs 54 through slots 88 and 90, respectively, between the upper and middle partition, while the strap 76 is snapped into the connecting structures 52 and tabs 54 through slots 92 and 94, respectively, between the middle and lower partitions. The rear upper and lower straps 78 and 80 are snapped into connecting tabs 56 through slots 93 and 95 between the upper and middle partitions and the middle and lower partitions, respectively. Additional support is provided by the bottom right and left supports 82 and 84 connected to the most left and most right lower partition, respectively. This design of the upper product storage apparatus 20 is easy to assemble and disassemble.

The upper product storage apparatus 20 are further preferably each so dimensioned that their chambers 86 measured between two adjoining vertical partitions 62 will be of lateral extent sufficient to just accommodate the highest height of product to be handled by the chamber 86 in proper single stack relationship therewith. Vertically, the chambers are dimensioned, measured perpendicularly between the inclined rails, such as 66 and 68, to just accommodate the product of largest diameter to be handled by the chamber.

Provision for top product storage apparatus selected are well known to those skilled in the art, and some various equipment forms thereof might be utilized without material effect upon the principle of the present invention. It should suffice to indicate that the types of adjustable, vertical partitions to provide storage zones with adjustable width utilizing the preferred embodiment of this invention include the type fully disclosed in Australian Patent No. 496,379, entitled "Product Dispensing Apparatus Having Adjustable Width Product Storage Chamber". The Australian Patent teaches the employment of a plurality of chamber defining wall assemblies that are individually selectively positionable laterally of the product storage space within an apparatus to present a plurality of side-by-side product storing chambers of respectively selectable widths, with each of the wall assemblies (other than the two at the outer sides of the two outermost chambers) being common to a pair of adjacent chambers, indexing means, such as tabs and sets of slots for selectively receiving the tabs, associated with an forming a part of the means for adjustably mounting the wall assemblies on frame structure within the apparatus to facilitate the mounting of adjacent wall assemblies in proper orientation and with a selected one of a plurality of predetermined spacings therebetween; and indexing means associated with and forming a part of the means for adjustably mounting the product releasing mechanism for the supply of products within the chamber between each pair of adjacent wall assemblies to facilitate centering, or other needed juxtaposition, of such mechanisms with respect to the chambers with which they are respectively associated. For the embodiment shown in FIG. 2, the width of the storage zones can be adjusted by varying the distance $d_w$ between adjacent slots on the horizontal support members 72-84 to accommodate different heights of cylindrical product to be dispensed.

Figure 3:
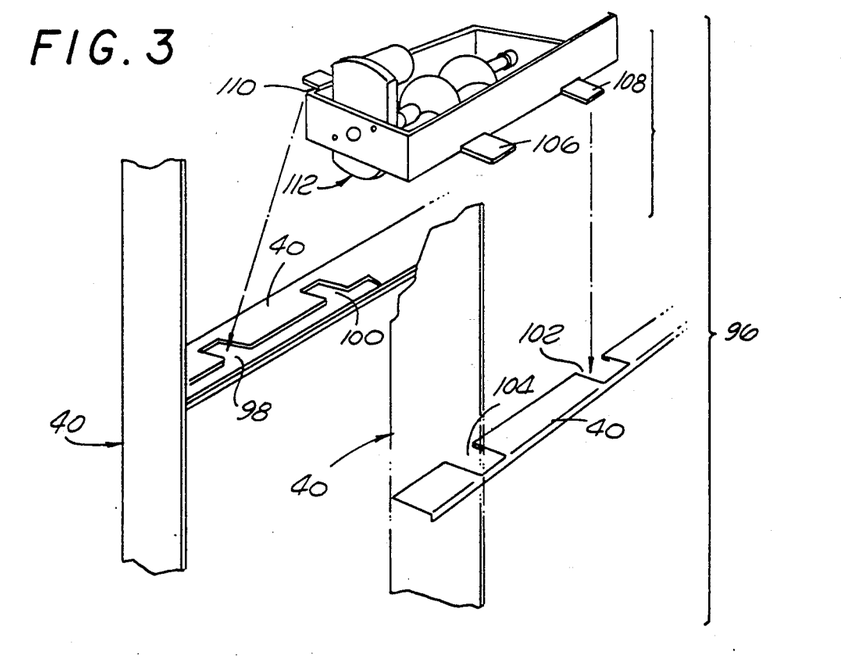
FIG. 3 is an enlarged, fragmentary perspective view taken along the intersection direction of the vending machine, showing details of one preferred embodiment in which the mechanism of the invention is mounted to the serpentine channel by means of taps on a bracket which are snapped into slots on the upper rails of the channel.

Now referring to FIG. 3, which shows an enlarged, fragmentary perspective view taken along the intersection direction of the apparatus 96 of the present invention, the novel product control dispensing apparatus 96 of the present invention is essentially formed with a unit of the serpentine feed magazine 24 having the upper inclined rail 66' running all the way to the front surface 40 of the vertical partition 62 and provided with notches 98-104 in which the four tabs 106-112 from the novel product control dispensing mechanism will slide into for connection.

Figure 4:
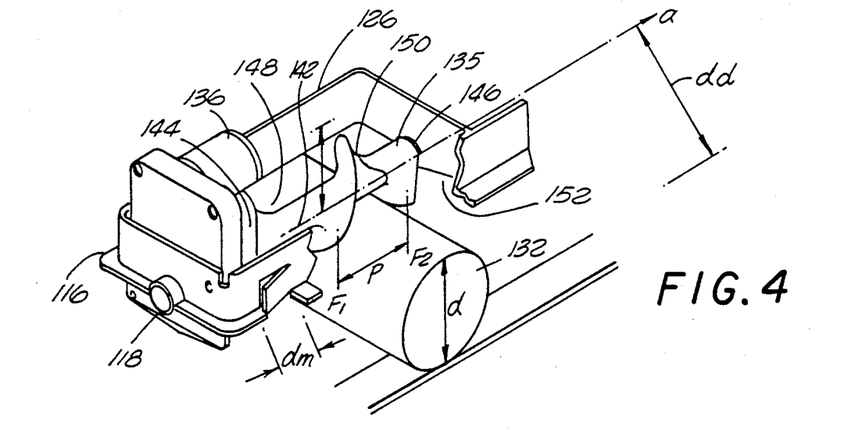
FIG. 4 is an enlarged, fragmentary perspective view taken along the intersection direction of the vending machine showing details of a second embodiment in which the mechanism of the invention is mounted by means of side taps on a bracket to the front surface of the serpentine channel for handling a cylindrical product for one vend column and vending section.

FIG. 4 shows another embodiment of the novel control dispensing mechanism in which the bracket 116 has been modified in the front with a side tab 118 to connect the mechanism to the front surface 40 of the vertical partition 62, and an L-shaped side arm support member 126 to be connected to the upper inclined rail 66' at the back.

Figure 5:
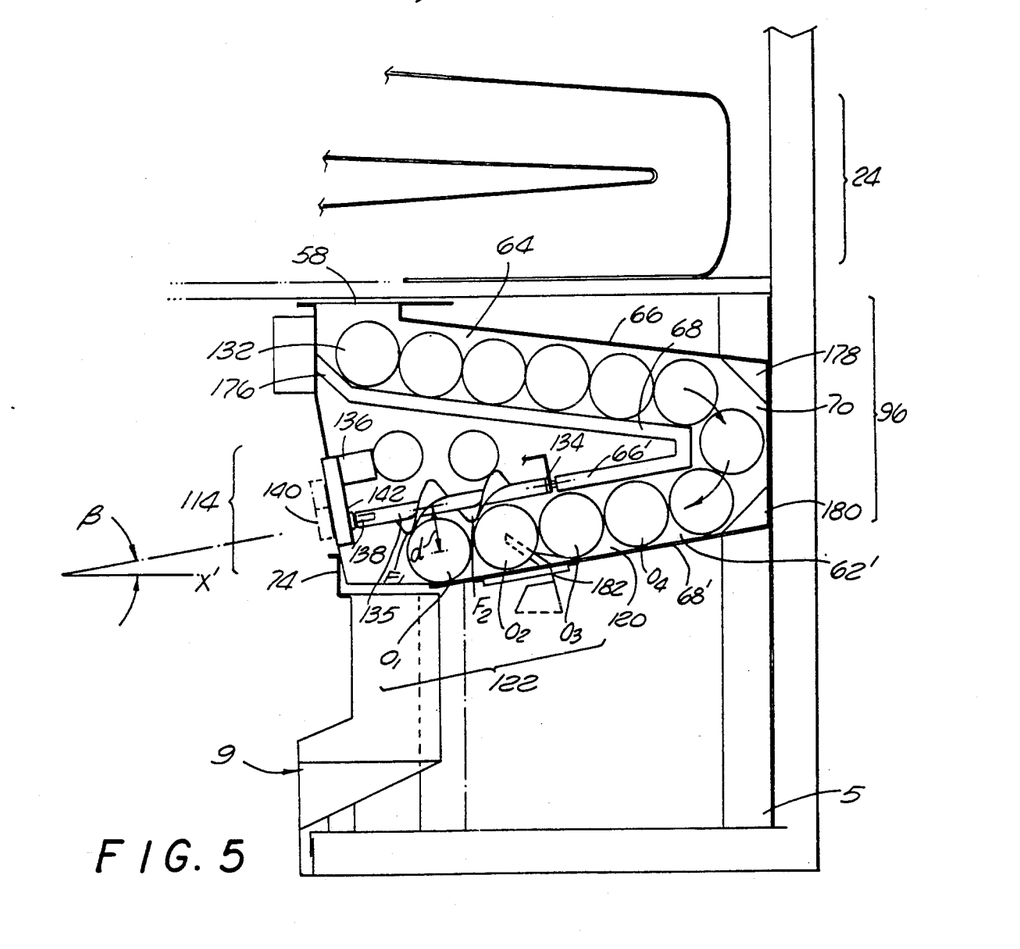
FIG. 5 is a transverse cross-sectional view of the interior of a machine as shown in FIG. 1 taken just below the upper serpentine feed magazine of FIG. 2, showing an embodiment in which the apparatus is mounted to the upper rails of the serpentine channel for handling a cylindrical product for one vend column and vending section.

FIG. 5 shows another embodiment of the novel control dispensing apparatus 96 in which the mechanism 114 is mounted onto the front surface 40 of the vertical partition 62. As shown in FIG. 5, the novel control dispensing apparatus 96 is further classified into a storage chamber 120 and a feeding, escrowing and dispensing (hereinafter known as "FED") chamber 122. The vertical partition structures 62' may be continuations of element 62 from the top storage serpentine feed magazine 24 or preferably independent from them.

Each storage chamber 120 is bounded at its sides by an adjacent pair of the partitions 62' or one of the sidewalls 5 or 6.

The storage chamber 120 is open at the upper extremity to communicate with the lower end of the top serpentine magazine for feeding, and partially at the front for product loading, and at the lower extremity to communicate with the FED chamber 122.

Each storage chamber 120 is further bound by the upper inclined rails 66 and 68, sloping downward from the front to the rear of cabinet; and a portion of the lower inclined rails 66' and 68', sloping upward from the front to the rear of the cabinet. The inclined rails 66 and 68 are mounted on or formed integrally with the vertical partitions 62' and inclined laterally, either downwardly or upwardly therefrom. As shown in FIG. 5, the turn 70 of the serpentine channel is snapped onto the upper and lower rear straps 78 and 80.

Inclined guiding structure 176 which forms part of the bottom wall of the opening 58 and triangular guiding structures 178 and 180 located at the rear turn portion of the serpentine channel are all centered relative to the width of the stacks of products. They are provided to insure that the cylindrical objects 132 roll down from the top serpentine feed magazine 24 and across the bottom serpentine channel smoothly without jamming or causing too much vibration to the cylindrical objects.

As shown in FIG. 5, the lower extremity of the storage chamber 120 is open to communicate with the upper extremity of the FED chamber 122. Each FED chamber is bound at its sides, similar to the storage chamber 120, by an adjacent pair of the partitions 62' or one of the sidewalls 5 or 6. Each FED chamber 122 is further bound horizontally by the frontal portion of the inclined rails 66' and 68' sloping upward from the front to the rear of the cabinet. Finally, longitudinally, each FED chamber 122 is bound by the lower front strap 74 in the front and the auger mounting panel 134 in the rear which could be the L-shaped side arm of the bracket 116.

At the end of the serpentine channel 64, centered relative to the width of the stack products, a motor driven plastic auger 135 is used to form the FED mechanism for the dispensing apparatus to control the feeding, escrowing and dispensing of cylindrical products 132 rolling down the inclined plane of the serpentine channel 24 under gravity.

The novel dispensing mechanism 114 provided for each product selection 132 includes, preferably, its own individual operable prime mover in the form of an electric motor 136 of well-known construction, mounted to a bracket that snaps into the plastic partitions. The motor 136 is provided with conventional power which is adapted for coupling with the selection and control circuitry of the apparatus 96. The drive shaft 138 of the motor 136 is coupled through a reduction gearbox 140 of the driven power shaft 142 of the plastic auger 135 which rotates through a revolution as the mechanism carries out a start-up or vending cycle.

The power shaft 142 is provided with the necessary switching and control circuitry and mechanical system so that after the motor 136 has been initiated, the motor will operate for a time to rotate the auger 135 a revolution sufficient for a full start-up or vending cycle.

It will be understood, therefore, that the running of motor 136 for a period sufficient to rotate the plastic auger 135, preferably a full revolution, represents a discrete FED cycle of the mechanism 114. Other forms of the invention may require less than a full revolution for a vending or start-up cycle.

The mechanism 114 provided for each product is snapped in the front onto the lower strap 76 with the axis of the power shaft 142 of the plastic auger inclined at an angle $\beta$ with a horizontal plane parallel to the bottom of the machine, and in the rear onto the auger mounting panel 134. Although $\beta$ may be of any value greater than 0, it is preferable to have a value so that the drive shaft of the auger 138 lies in a horizontal plane parallel to the upper outer wall 68' of the serpentine channel to maximize performance.

As can be seen in FIG. 4, the plastic auger 135 generally comprises at least one, preferably two or more flights (F). The flight can be left or right turning with height "H" measured perpendicularly from the "amplitude" of the flight (i.e. F1, F2) to the axis a along the center of the shaft 142. The distance between two adjacent flights such as F1 and F2 is measured as P. The plastic auger 135 has a frontal end 144 and a rear end 146. The frontal end of the auger 144 is coupled to the motor 136 and is the advancement direction of the auger. At the extremity of the frontal end of the auger is the dispensing zone 148 in which flights are specifically terminated for a distance dm measured from the motor 136. The polarity of the motor can be adjusted so that the auger can be driven in either a clockwise or counterclockwise direction depending upon the turning direction of the flights of the plastic auger. The direction of the motor drive is consistent with the direction of the turn of the flight on the plastic auger so that the cylindrical products 132 with diameters d, will move into the dispensing zone 148 for releasing. Although the dispensing zone may be of any practical length dm, it is preferable that dm be slightly greater than the diameter d of the largest cylindrical products 132 to be dispensed to provide a quick vend to the customer and to maximize useful storage space in the dispensing apparatus.

Adjacent to the dispensing zone 148 is the escrowing zone 150 in which cylindrical product 132 is being retained there between flight F1 and F2 for transferring to the dispensing zone 148 during the next vend cycle. Following the escrowing zone is the feeding zone 152 in which cylindrical product 132 is retained there by flight F2 (and F3 when the plastic auger contains more than two flights) for feeding to the escrowing zone 150 during the next vend cycle.

The distance P, between two adjacent flights is generally chosen to be slightly greater than the diameter of the largest cylindrical product 132 to be dispensed. The height of the flight measured perpendicularly from the shaft of the auger to the amplitude of the flight can be of any value greater than 0 as long as the cylindrical product 132 in the serpentine channel is retained in the escrowing zone 150 between flights F1 and F2 and prevented from rolling down into the dispensing zone 148, when the shaft of the auger is mounted at a distance dd measured perpendicularly from the shaft to the center of the cylindrical product to be dispensed.

Figure 6:
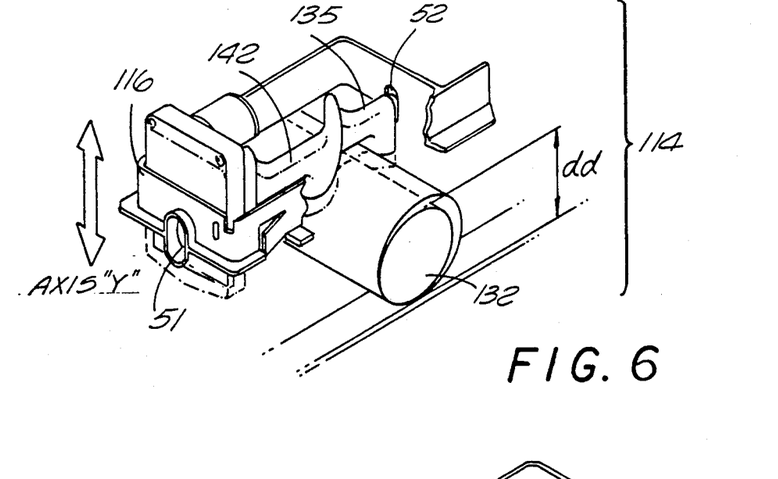
FIG. 6 is similar to FIG. 2 and shows a preferred embodiment in which the distance of an auger from a cylindrical product can be adjusted vertically along a y' axis to dispense products of a smaller diameter $d_s$.

Since it may be desired to offer as selections various types of products 132 from the apparatus 96 with varying diameters or other transverse dimensions, and since the lateral spacing between adjacent partitions 62' and/or side walls 5 and 6 and the distance between flights F1 and F2 is determined by the transversely largest product 132 to be handled, provision for appropriate adjustment of the distance dd vertically along the y' axis may be needed, in order to dispense products of a smaller diameter. This is accomplished in the mechanism 114 by making the front and rear mounts of the drive power shaft 142 of the plastic auger 135 slidable along the y' axis through slots S1 and S2 on the front and L-shaped side corner of the plastic bracket 116, respectively, as shown in FIG. 6.

An alternate method to adjust the location of the sloped rails with respect to the auger flight (i.e., distance dd) is through shims, spacers or other well-known adjustment means to dispense products of smaller diameters.

Figure 7:
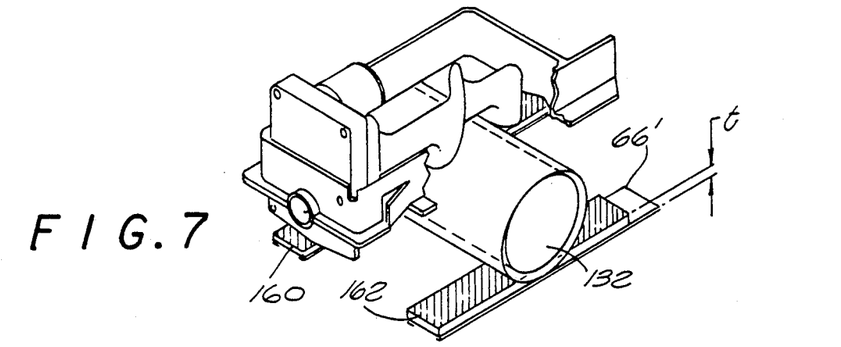
FIG. 7 is similar to FIG. 3 and shows a preferred embodiment in which spacers are used to dispense products of a smaller diameter $d_s$.

As shown in FIG. 7, spacers 160 and 162 of thickness t are placed on top of the lower inclined rails 66' of the novel control dispensing mechanism 114 to shorten the vertical distance d in order to dispense products of a smaller diameter. The thickness t of the spacers can be varied depending on the diameter of the products 132 to be dispensed. The spacers can be constructed of plastic, rubber or metal and can be held onto the lower inclined rails 66' by gravity or friction between the surfaces of the spacer and the rails.

Figure 8:
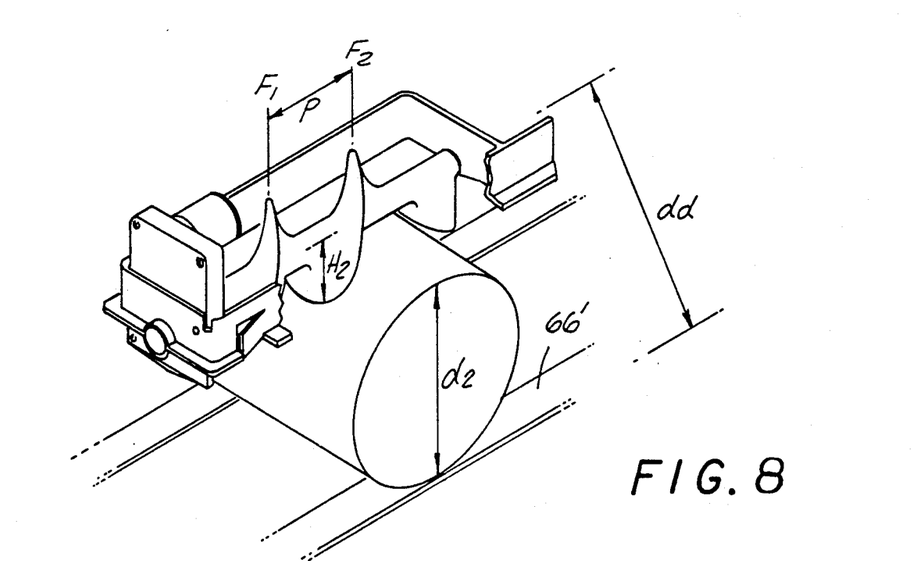
FIG. 8 is similar to FIG. 3 and shows a preferred embodiment in which a different auger is used to dispense products of a larger diameter $d_s$.

To dispense products of a larger diameter $d_2$, a different auger with lower heights $H_2$ and/or wider distance P between adjacent flights $F_1$ and $F_2$ can be used (see FIG. 8). In the alternative, the vertical distance dd can be expanded to accommodate the product with a larger diameter $d_2$ by lowering the lower inclined rails 66'.

Figure 9:
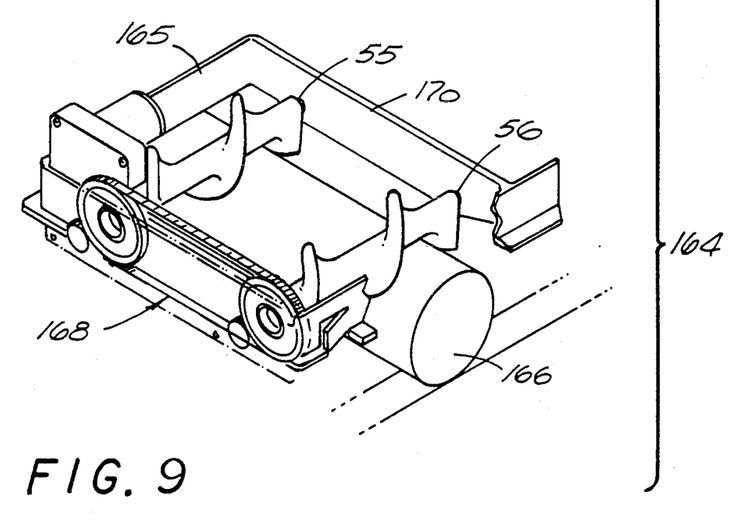
FIG. 9 is a side perspective view of the apparatus, showing a preferred embodiment in which two augers are used to dispense products of a length $l_e$ longer than conventional cans.

FIG. 9 shows a mechanism 164 for dispensing a product 166 longer than conventional cans. The mechanism 164 is formed by the combination of a modified bracket 165 which houses a timing belt drive mechanism 168 in the front mounting surface, and a corresponding elongated L-shaped side bar 170 in which the rear ends of two auger drive shafts are inserted into slots $S_5$ and $S_6$, respectively. The lateral spacing distance between adjacent vertical partitions 62' and/or side walls 5 or 6 is also expanded accordingly to accommodate the product 166 which is longer than conventional cans.

Figure 10:
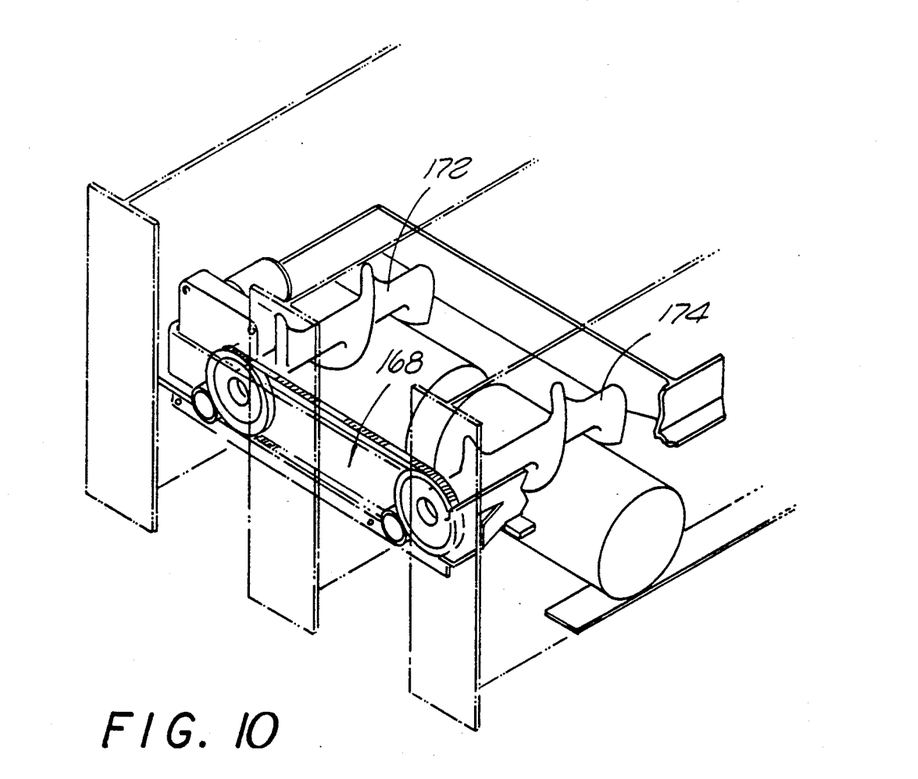
FIG. 10 is a side perspective view of the apparatus, showing a preferred embodiment in which a second auger is coupled to a first powered auger and the mechanism is timed so that the two adjoining columns can be controlled to vend alternately one flavor or product per cycle.

FIG. 10 shows a second auger 172 coupled to a first auger 174 by means of a timing belt drive 168. By proper timing of the dispensing mechanism of two adjacent columns, products from the two columns can be dispensed simultaneously or alternately. The coupling of the two augers by the timing belt drive eliminates the need for two complete vending mechanisms for the two adjacent columns thus leading to further reduction of parts, cost, maintenance and space requirements in the vending machine.

OPERATION

The operation of the described embodiment of the subject invention is believed to be clearly apparent and is briefly summarized at this point.

START-UP

Referring particularly to FIG. 5, it will be seen that a single stack of products 132, such as beverage packages in bottles or cylindrical products roll individually from the lower extremity of the upper serpentine magazine by gravity into the upper extremity of the lower serpentine channel through guiding structure 176, down the channel 64 along triangular guiding structures 178 and 180. The stack of products in a single column contain from the bottom up products O-1, O-2, etc. The lowermost cylindrical product O-1 is retained by flight F2 of the plastic auger from advancing by gravity. The motor 136 is then activated to drive the auger 135 in the direction of the advancement of the flight. As the auger 135 rotates, flight F2 releases and cylindrical product O-1 is fed by gravity and advanced to the most frontal flight F1. After one complete revolution, having a predetermined normal period of time duration from the initial energization of the motor 136, cylindrical product O-1 is advanced from F2 to F1 and escrowed there ready for the first normal vend cycle.

Vending Conditions

After the start-up cycle, the vending machine is now ready for the vend cycle. Referring particularly to FIG. 5 again, in the initial standby position, cylindrical product O-1 is retained by flight F1 of the auger 135. Cylindrical product O-2 is retained by flight F2 of the auger 135 from advancing by gravity. As soon as a customer deposits the correct coinage and a selection has been made, motor 136 is then activated to drive the auger 135. As the auger 135 rotates, cylindrical product O-1 will be dispensed by gravity and rolled along the serpentine channel from the escrowing zone 150 into the dispensing zone 148 and released into the delivery chute for delivery to the customer, as the flight of the auger ends at the frontal end of the auger. Simultaneously, cylindrical product O-2 will be fed by gravity and rolled from position F2 to F1 and will be escrowed there after the auger 135 has rotated one revolution for the completion of one vend cycle. Similarly, cylindrical product O-3 will be fed by gravity and rolled into feeding position and will be retained there by F2. This process repeats for each vend cycle until all the products have been exhausted. A sold-out sensor/lock-out means and jamming device is normally provided in the dispensing equipment and may be of any suitable form. For purpose of illustration, a sold-out sensor flap 182 is shown in FIG. 5. As long as there is a product 132 along the serpentine channel 64, the sold-out device 182 will remain in its normal or closed position. However, once the last product has moved past the sold-out sensor flap, the sold-out sensor indicator will flap upwardly to the sold-out position and activate some sort of sign to indicate that the particular selection whose supply of products has been depleted is "sold-out".

With the improved novel and highly reliable dispensing system 164, the likelihood of any jamming of product 132 within the channel 64 or the dispensing zone 148 associated therewith is greatly reduced, as compared with conventional equipment of this class, that provision for such a condition is mainly to satisfy the commercial demand therefore that carries over from experience with jamming in earlier types of equipment and to provide such protection in case it might be needed in various adverse special situations. The jamming provisions are well-known to those skilled in the art and some various equipments forms thereof might be utilized without material effect upon the principle of the present invention. It should suffice to indicate that the type of jamming means utilized in the preferred embodiment of this invention is of the type fully disclosed in U.S. Pat. No. 3,844,394 entitled "Electrical Means for Controlling the Operation of a Vending Machine Offering a Plurality of Product Types on a Selective Basis", the disclosure of which is hereby incorporated herein by reference.

Those skilled in the art will fully appreciate that the preferred embodiment shown and desirable to illustrate the invention is exemplary only and that the same principles may be employed in providing improved selective product dispensing systems for accommodating differing numbers of product varieties and other product quantity mixes. It will be further appreciated that various other modifications or changes, particularly with respect to details of construction, might be made without departing from the gist and essence of the invention. Accordingly, it should be further understood that the invention should be deemed limited only by the scope of the claims which follow and should be interpreted as encompassing all constructions fairly regardable as mechanical equivalents of the subject matter to which claims are directed.

Having described our invention, what we claim and desire to secure by Letters Patent is:

1. An apparatus for storing, feeding, escrowing and selectively dispensing generally cylindrical products of a plurality of different kinds comprising:
   (i) storage and delivery means in the form of a serpentine channel for each variety of said products to be stored and dispensed comprising:
      a front, a rear, a left and a right vertical surface connected to an inclined surface sloping downward towards a product outlet;
      said inclined surface further comprising adjustable means for working with said products with different diameters in a single stack;
      product guiding structures presenting passageway means for guided movement of said product through said channel to deliver product of said one kind towards said product outlet; and
   (ii) rotatable feeding, escrowing and dispensing means connected to said storage and delivery means, each of said rotatable feeding, escrowing and dispensing means and storage and delivery means providing chambers for receiving and delivering a plurality of said products of the corresponding variety, each feeding, escrowing and dispensing means in combination with said left, right vertical surfaces and said inclined surface further defining an upper feeding zone, an intermediate escrowing zone and a lower dispensing zone for feeding, escrowing and dispensing said cylindrical products respectively along said inclined surface towards said product outlet, said rotatable, feeding, escrowing and dispensing means comprising:

means for mounting said rotatable feeding, escrowing and dispensing means to said storage and delivery means centered relative to the width of the stack of products and parallel to said inclined surface from which said products are rolling down towards said product outlet;

means for rotating said rotatable feeding, escrowing and dispensing means, for a predetermined period of time duration, through:

(a) an initial start-up cycle, comprising:
 (1) a first position in which the lowest cylindrical product is positioned in said upper feeding zone and supported by said rotatable feeding, escrowing and dispensing means from rolling down said inclined surface towards said product outlet;
 (2) a second position in which said rotatable feeding, escrowing and dispensing means is rotated from said first position through a revolution and feeds the lowest product from said upper feeding zone to said intermediate escrowing zone and supports said product there from rolling down said inclined surface towards said product outlet while simultaneously a second lowest cylindrical product is being fed from said stack of products into said upper feeding zone and supported there by said rotatable feeding, escrowing and dispensing means from rolling down said inclined surface towards said product outlet;

(b) a normal dispensing cycle comprising:
 a normal dispensing position in which the lowest product previously positioned in said intermediate escrowing zone and supported by said rotatable feeding, escrowing and dispensing means is released at the predetermined location rolling down said inclined surface towards said product outlet, while simultaneously, the second lowest product previously positioned in said upper feeding zone is being fed to said intermediate escrowing zone and supported there by said rotatable means, while simultaneously a third lowest product is being fed from said stack of products into said upper feeding zone and supported there by said rotatable feeding, escrowing and dispensing means from rolling down said inclined surface towards said product outlet; and (iii) means mounting said rotating means to said rotatable feeding, escrowing and dispensing means through said above initial start-up and normal dispensing cycles.

2. An apparatus as set forth in claim 1 wherein:
said adjustable means includes shims, spacers and movable ramps placed on top of said inclined surface for selectively positioning and holding said products along said inclined surface.

3. An apparatus as set forth in claim 1 wherein:
said inclined surface is adjustable vertically for axially confining said single stack of products with different diameters in said chambers of the corresponding storage and delivery means and rotatable feeding, escrowing and dispensing means.

4. An apparatus as set forth in claim 1, wherein:
said left and right vertical surfaces maintaining said products received in said chamber of said storage and delivery means and rotatable feeding, escrowing and dispensing means further includes adjustable means for laterally confining said single stack of products in said chamber.

5. An apparatus as set forth in claim 1, wherein:
said feeding, escrowing and dispensing means for each variety of said products in a single stack comprises an auger having rotating shaft with flights for feeding, escrowing and dispensing said product at predetermined location;

said mounting means for the feeding, escrowing and dispensing means includes a bracket provided with shiftable adjustment mounts for selectively anchoring the feeding, escrowing and dispensing means slidable along a vertical axis perpendicular to a plane parallel to the downward advancement of said product along said inclined surface for working with said products with different diameters in a single stack.

6. An apparatus as set forth in claim 1, wherein said feeding, escrowing and dispensing means are snapped into the front and rear mounting straps by said mounting means at an angle $\beta$ greater than 0 between an axis of the shaft of the auger and a horizontal plane parallel to a bottom wall of the machine.

7. A machine normally adapted for selectively dispensing any of a plurality of different products from separate supplies thereof and stored in the machine and provided with control dispensing apparatus comprising:

(i) storage and delivery means in the form of a serpentine channel for each variety of said products to be stored and dispensed comprising:
 a front, a rear, a left and a right vertical surface connected to an inclined surface sloping downward towards a product outlet;
 said inclined surface further comprising adjustable means for working with said products with different diameters in a single stack;
 product guiding structures presenting passageway means for guided movement of said product through said channel to deliver product of said one kind towards said product outlet; and (ii) rotatable feeding, escrowing and dispensing means connected to said storage and delivery means, each of said rotatable feeding, escrowing and dispensing means and storage and delivery means providing chambers for receiving and delivering a plurality of said products of the corresponding variety, each feeding, escrowing and dispensing means in combination with said left, right vertical surfaces and said inclined surface further defining an upper feeding zone, an intermediate escrowing zone and a lower dispensing zone for feeding, escrowing and dispensing said cylindrical products respectively along said inclined surface towards said product outlet, said rotatable feeding, escrowing and dispensing means comprising:

means for mounting said rotatable feeding, escrowing and dispensing means to said storage and delivery means centered relative to the width of the stack of products and parallel to said inclined surface from which said products are rolling down towards said product outlet;

means for rotating said rotatable feeding, escrowing and dispensing means, for a predetermined period of time duration, through:

(a) an initial start-up cycle, comprising:
  (1) a first position in which the lowest cylindrical product is positioned in said upper feeding zone and supported by said rotatable feeding, escrowing and dispensing means from rolling down said inclined surface towards said product outlet;
  (2) a second position in which said rotatable feeding, escrowing and dispensing means is rotated from said first position through a revolution and feeds the lowest product from said upper feeding zone to said intermediate escrowing zone and supports said product there from rolling down said inclined surface towards said product outlet while simultaneously a second lowest cylindrical product is being fed from said stack of products into said upper feeding zone and supported there by said rotatable feeding, escrowing and dispensing means from rolling down said inclined surface towards said product outlet;
(b) a normal dispensing cycle comprising:
  a normal dispensing position in which the lowest product previously positioned in said intermediate escrowing zone and supported by said rotatable feeding, escrowing and dispensing means is released at the predetermined location rolling down said inclined surface towards said product outlet, while simultaneously, the second lowest product previously positioned in said upper feeding zone is being fed to said intermediate escrowing zone and supported there by said rotatable means, while simultaneously a third lowest product is being fed from said stack of products into said upper feeding zone and supported there by said rotatable feeding, escrowing and dispensing means from rolling down said inclined surface towards said product outlet; and
(iii) means mounting said rotating means to said rotatable feeding, escrowing and dispensing means through said above initial start-up and normal dispensing cycles.

* * * * *